(12) United States Patent
Nagaosa et al.

(10) Patent No.: US 12,362,085 B2
(45) Date of Patent: Jul. 15, 2025

(54) INDUCTOR ELEMENT AND APPARATUS INCLUDING SAME

(71) Applicant: RIKEN, Wako (JP)

(72) Inventors: Naoto Nagaosa, Wako (JP); Yoshinori Tokura, Wako (JP); Tomoyuki Yokouchi, Wako (JP); Masashi Kawasaki, Wako (JP); Yoshichika Otani, Wako (JP); Maximilian Anton Hirschberger, Wako (JP)

(73) Assignee: RIKEN, Saitama (JP)

( * ) Notice: Subject to any disclaimer, the term of this patent is extended or adjusted under 35 U.S.C. 154(b) by 710 days.

(21) Appl. No.: 17/264,510

(22) PCT Filed: Aug. 1, 2019

(86) PCT No.: PCT/JP2019/030236
§ 371 (c)(1),
(2) Date: Jan. 29, 2021

(87) PCT Pub. No.: WO2020/027268
PCT Pub. Date: Feb. 6, 2020

(65) Prior Publication Data
US 2021/0383955 A1    Dec. 9, 2021

(30) Foreign Application Priority Data
Aug. 1, 2018 (JP) .................................. 2018-145483

(51) Int. Cl.
*H01F 17/04* (2006.01)
*H01F 27/24* (2006.01)
*H01F 27/28* (2006.01)

(52) U.S. Cl.
CPC ........... *H01F 17/045* (2013.01); *H01F 27/24* (2013.01); *H01F 27/2823* (2013.01)

(58) Field of Classification Search
CPC .... H01F 17/045; H01F 27/24; H01F 27/2823; H01F 10/329; H01F 17/04; H01F 10/193; H01F 17/00; B82Y 25/00
See application file for complete search history.

(56) References Cited

U.S. PATENT DOCUMENTS

2010/0304976 A1\* 12/2010 Overweg ................ H01F 27/34
335/297
2016/0351242 A1    12/2016 Nagaosa et al.
(Continued)

FOREIGN PATENT DOCUMENTS

EP    3 107 126 A1    12/2016
EP    3782209 A1    2/2021
(Continued)

OTHER PUBLICATIONS

Barnes et al., "Generalization of Faraday's Law to Include Nonconservative Spin Forces," *Physical Review Letters* 98: 246601, 2007. (4 pages).
(Continued)

*Primary Examiner* — Mang Tin Bik Lian
(74) *Attorney, Agent, or Firm* — Seed Intellectual Property Law Group LLP

(57) ABSTRACT

In order to obtain an inductor element advantageous for miniaturization, an inductor element 10 according to an embodiment of the present disclosure is provided with a metal medium 2 in which ordered spins are spatially arranged so as to have a non-collinear spin structure when traced in a certain direction. In the inductor element, an electric current I is applied through the metal medium so as to have a projective component of the direction. Preferable examples of the non-collinear spin structure for the metal medium include a spiral structure and a cycloidal structure.

5 Claims, 7 Drawing Sheets

(56) References Cited

U.S. PATENT DOCUMENTS

| | | | |
|---|---|---|---|
| 2017/0018297 A1* | 1/2017 | Zang | H10N 50/01 |
| 2017/0229160 A1* | 8/2017 | Ma | H10N 52/00 |
| 2017/0260634 A1* | 9/2017 | Sullivan | C25B 11/02 |
| 2021/0119114 A1* | 4/2021 | Fukami | H10N 50/85 |

FOREIGN PATENT DOCUMENTS

| | | | |
|---|---|---|---|
| JP | 2012527098 A | | 11/2012 |
| WO | 2015/118579 A1 | | 8/2015 |
| WO | 2015/118748 A1 | | 8/2015 |
| WO | WO 2016021349 A1 | | 2/2016 |
| WO | WO 2016158230 A1 | | 10/2016 |
| WO | WO 2017083994 A1 | | 5/2017 |
| WO | WO-2017222588 A1 | * | 12/2017 |

OTHER PUBLICATIONS

Hai et al., "Electromotive force and huge magnetoresistance in magnetic tunnel junctions," *Nature 458*:489-492, 2009.

Kishine et al., "Coherent sliding dynamics and spin motive force driven by crossed magnetic fields in chiral helimagnet," *Phys. Rev. B 86*: 214426, 2012.

Murata Manufacturing Co. Ltd., "World's highest inductance value! Expanded lineup of ultra-compact 0201-inch (0603mm)-size high-frequency chip inductors for smartphones—the LQP03TN_02 series—" Published Feb. 27, 2014 https://www.murata.com/en-global/products/emiconfun/inductor/2014/02/27/en-20140227-p1 . (6 pages).

Soumyanarayanan et al., "Tunable room-temperature magnetic skyrmions in Ir/Fe/Co/Pt multilayers," *Nature Materials 16*:898-904, 2017.

Tatara et al., "Theory of Current-Driven Domain Wall Motion: Spin Transfer versus Momentum Transfer," *Physical Review Letters 92*(8): 086601, 2004. (5 pages).

Woo et al., "Observation of room-temperature magnetic skyrmions and their current-driven dynamics in ultrathin metallic ferromagnets," *Nature Materials 15*:501-506, 2016.

Chandragiri et al., "Magnetic behavior of $Gd_3Ru4Al_{12}$, a layered compound with distorted Kagome net," *Journal of Physics: Condensed Matter 28*, doi: 10.1088/0953-8984/28/28/286002, published online May 2016, 14 pages.

Chinese Office Action, dated Mar. 3, 2023, for Chinese Patent Application No. 201980050902.7, 5 pages.

Nagaosa et al., "Topological properties and dynamics of magnetic skyrmions," *Nature Nanotechnology*, vol. 8, No. 12, pp. 899-911, Dec. 4, 2013.

T. Schulz et al., "Emergent electrodynamics of skyrmions in a chiral magnet," *Nature Physics*, vol. 8. No. 4, pp. 301-304, Feb. 19, 2012.

* cited by examiner

Case A    $v_{pin} \ll \alpha\, v_{int} \ll v_{int}$

Case B    $\alpha\, v_{int} \ll v_{pin} \ll v_{int}$

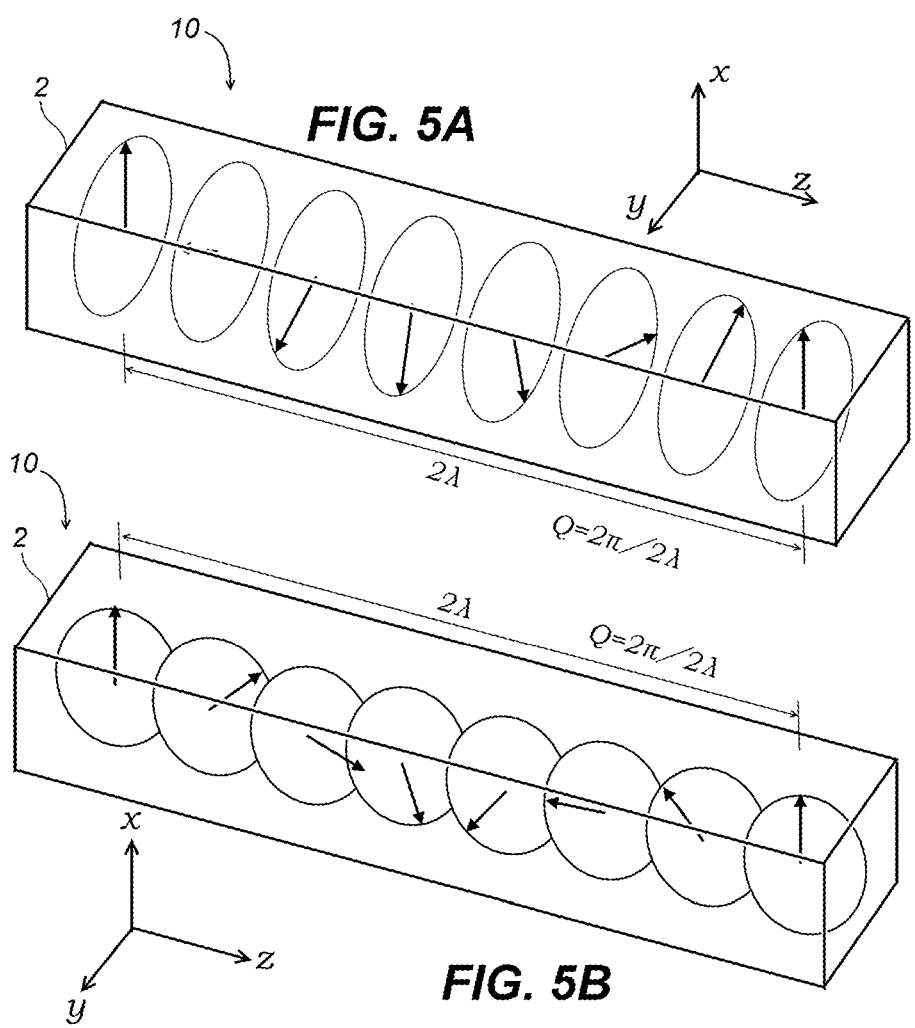

INDUCTOR ELEMENT AND APPARATUS INCLUDING SAME

TECHNICAL FIELD

The present disclosure relates to an inductor device and an apparatus comprising the same. More particularly, the present disclosure relates to an inductor element that utilizes a spin structure of electrons and an apparatus comprising the same.

BACKGROUND ART

Among basic electronic devices, basic passive elements in electric circuits that provide a linear relationship between applied voltage and current are typically the R (resistance), C (capacitance), and L (inductance) elements. The physical function of each element is the generation of heat associated with electric current (R), storing energy by electric charge (C), and storing energy by magnetic field (L). Among these, elements responsible for inductance L (inductor elements) in particular have lagged behind in miniaturization. For instance, a product that shows the smallest size with a high inductance value has a size of 0.6×0.3×0.3 mm$^3$ with inductance value of about L=130 nH to 270 nH.

On the other hand, there have been discoveries of physical phenomena with a different operating principle from those of conventional basic electronic elements, which primarily rely on electrons' spin in addition to charge. These physical phenomena are being used in passive devices, active devices, and memory devices. Such a field is sometimes referred to as spintronics, which has shown marked progress these days.

CITATION LIST

Non-Patent Documents

Non-Patent Document 1: Gen Tatara and Hiroshi Kohno, "Theory of Current-Driven Domain Wall Motion: Spin Transfer versus Momentum Transfer," Phys. Rev. Lett. 92, 086601 (2004), DOI: 10.1103/PhysRevLett.92.086601

Non-Patent Document 2: S. E. Barnes and S. Maekawa, "Generalization of Faraday's Law to Include Nonconservative Spin Forces," Phys. Rev. Lett. 98, 246601 (2007), DOI: 10.1103/PhysRevLett. 98.246601

Non-Patent Document 3: Pham Nam Hai et al., "Electromotive force and huge magnetoresistance in magnetic tunnel junctions," Nature 458, 489-492 (2009) DOI: 10.1038/nature07879

Non-Patent Document 4: Jun-ichiro Kishine et al., "Coherent sliding dynamics and spin motive force driven by crossed magnetic fields in a chiral helimagnet," Phys. Rev. B 86, 214426 (2012) DOI: 10.1103/PhysRevB.86.214426

Non-Patent Document 5: LQP03TN_02 series webpage in Murata Manufacturing Co., Ltd. website, [online] last retrieved: Jul. 18, 2019, URL; https://www.murata.com/en-global/products/emiconfun/inductor/2014/02/27/en-20140227-pl Non-Patent Document 6: Anjan Soumyanarayanan et al., "Tunable room-temperature magnetic skyrmions in Ir/Fe/Co/Pt multilayers", Nature Materials 16, 898-904 (2017) DOI: 10.1038/nmat4934

Non-Patent Document 7: Seonghoon Woo et al., "Observation of room-temperature magnetic skyrmions and their current-driven dynamics in ultrathin metallic ferromagnets", Nature Materials 15, 501-506 (2016) DOI: 10.1038/nmat4593

SUMMARY OF DISCLOSURE

Technical Problem

With the continuing progress in miniaturization of various electronic devices, the demand for miniaturization of various electronic circuit elements remains unabated. In particular, the volume of conventional inductor elements has to be increased in order to gain a higher inductance value. There has been no known operating principle that can realize miniaturization.

The present disclosure aims to solve at least some of the problems mentioned above. The present disclosure provides a new principle of inductor elements that utilizes the quantum phenomenon observed in the conduction electrons interacting with the spin structure of electrons, thereby contributing to the miniaturization and high density of electronic circuits employing inductor elements and apparatuses containing them.

Solution to Problem

The inventors came to the conclusion that it is difficult to miniaturize inductor devices as long as they operate on the principle of conventional inductor devices, i.e., the principle of coupling an electric current to magnetic energy generated within a space or in a magnetic material. Then, we have created a new concept of inductor elements adopting degree of freedom of electrons' spin, and completed the present disclosure.

That is, in certain aspects of the present disclosure provided is an inductor element comprising a metal medium with a spatially arrangement of ordered spins such that the ordered spins have a non-collinear spin structure when traced in a direction, wherein an electric current is applied through the metal medium in such a way that the electric current has a projection component in the direction.

The term "inductor element" includes elements and devices also referred to as reactance elements, reactors, etc., unless otherwise noted hereinafter. In addition, due to limitations in the notation of the application document, the term "vector" may be added to the alphabet denoting a variable in the text in place of indicating an arrow above the alphabet. Likewise, due to limitations in notation, the term h-bar may be used in the text to mean the Planck constant h divided by 2π. In addition, due to limitations in notation, academic conventions such as distinguishing variables among constants and variables by italicizing them are not expressed in characters, but only in embedded images. Inconsistencies with conventions due to these restrictions in notation and apparent inconsistencies occurring in written documents shall not affect the disclosure of this disclosure or the interpretation of the scope of rights, as they are caused by constraints imposed on the notation.

Advantageous Effects of Disclosure

In a certain aspect of the present disclosure, there is provided an inductor element and an electronic device including the same, which are based on a novel operating principle and can be easily miniaturized.

BRIEF DESCRIPTION OF DRAWINGS

FIGS. 5A and 5B provide explanatory illustrations of the non-collinear spin structure in an embodiment of the present disclosure, showing, in contrast to the helical structure (FIG. 5A), the spin structure of the cycloidal structure (FIG. 5B).

DESCRIPTION OF EMBODIMENTS

Figure 1:
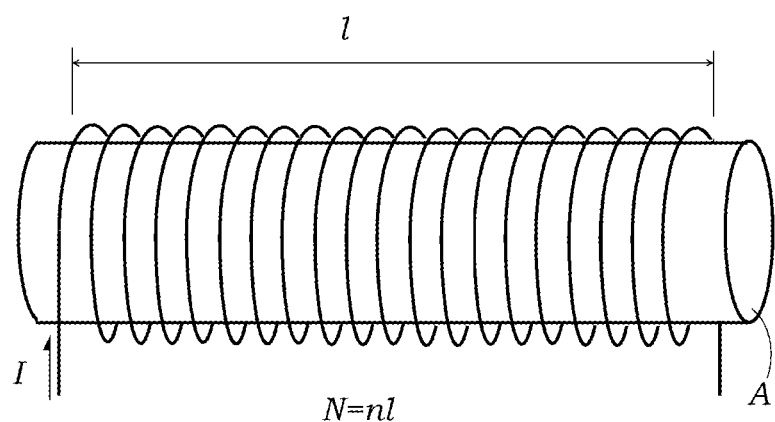
FIG. 1 is an illustration of the operating principle of a conventional inductor element.

Embodiments of the inductor elements of the present disclosure will be described by referring to the following drawings. Throughout the drawings, common parts or elements are denoted by common reference numerals in this description, unless otherwise noted. In addition, each element of each embodiment in the drawing should be understood as not being drawn to scale.

1. Principle
1-1. Difficulty in Miniaturization in Conventional Inductor Elements An illustration of the operating principle of a conventional inductor device is shown in FIG. 1. In an inductor element, a potential difference V that is proportional to a temporal change in current I is generated by electromagnetic induction. The relationship can be expressed as follows,

[Formula 1]

$$V = L\frac{dI}{dt} \quad (1)$$

where L denotes the inductance. The most typical inductor element is the coil shown in FIG. 1. A material with a large permeability p, such as an iron core, may be placed in the center to increase the magnetic flux density $B=\mu H$, and the number of turns N increases the potential difference V in Equation (1). In the coil shown in FIG. 1, the inductance L is given by the following,

[Formula 2]

$$L = \mu\frac{N^2 A}{l} = \mu n^2 lA \quad (2)$$

where $n=N/l$ is the number of turns per unit length. With the increasing miniaturization of circuits, it is required to obtain a sufficiently large inductance L even though A and l are kept small. However, as shown in the rightmost side of Equation (2), if the number of turns n per unit length is constant, the inductance L becomes small in proportion to the volume lA of the inductor element. As mentioned above, the smallest size and high inductance values that have been commercialized make up a size of $0.6 \times 0.3 \times 0.3$ mm³ to obtain an inductance value of about L=130 nH to 270 nH, for example. As long as it is based on the conventional principle, further miniaturization is difficult.

1-2. Inductance by Interaction Between Conduction Electrons and Ordered Spins (Principle)

In stark contrast to the conventional one, the operating principle in this embodiment utilizes the interaction between the electron spin and the conduction electrons.

Electrons behave as tiny magnets due to the fact that they have an angular momentum h-bar/2. Here, h-bar is the Planck constant h divided by $2\pi$. Generally speaking, electron spins are the building blocks for the higher-order structure (magnetic structure or magnetic order) that produces the magnetic properties of materials such as ferromagnetism. The magnetic order in a material is determined by the arrangement of ordered electron spins (ordered spin), or spin structure. The ordered spins that can generate a spin structure are typically spins of localized electrons (localized spins) or spins of conduction electrons when the conduction electrons themselves create a magnetic order. The spin structure may take on a parallel spin structure or an anti-parallel spin structure. Parallel and anti-parallel spin structures are the origin of ferromagnetic and antiferromagnetic order, respectively, and both are spatially uniform. Spatially uniform structures that are either parallel or antiparallel, such as parallel and antiparallel spin structures, are also called collinear spin structures. On the other hand, it is also known that spin structures with inclination, in which nearby spins are neither parallel nor antiparallel, can be realized in materials, and are called non-collinear spin structures. The inductor elements of the present embodiment are related to this non-collinear spin structure.

When the ordered spins have a non-collinear spin structure, the wavefunction of conduction electrons propagating through the non-collinear spins is affected by the spatial structure of the ordered spins through Hund's coupling, which leads to the spin Berry phase. In terms of the effect on the conduction electrons, the spin Berry phase acts in the same way as the vector potential of the electromagnetic field. For this reason, the effect of the said spin Berry phase on the conduction electrons can also be described by an electromagnetic field ("emergent electromagnetic fields"), which is a vector potential with an equivalent effect. We introduce a vector n, which typically represents a spin structure created by, for example, the spin orientation of localized electrons in a material. The vector n has one fixed direction for each position in the xyz Cartesian coordinate system and is time-dependent. The emergent electromagnetic field for describing the effects of the spin structure

[Formula 3]

$$\vec{n} \quad (3)$$

on the conduction electrons can be described in general as

[Formula 4]

$$e_i = \frac{\hbar}{2e}\vec{n}\cdot(\partial_i\vec{n}\times\partial_t\vec{n}) \quad (4.1)$$

$$b_i = \frac{\hbar c}{2e}\varepsilon_{ijk}\vec{n}\cdot(\partial_j\vec{n}\times\partial_k\vec{n}). \quad (4.2)$$

(4)

Here, the subscripts i, j, and k indicate the components of the Cartesian axes x, y, and z, and are chosen cyclically, $e_i$ and $b_i$ are the components of the emergent electric field and the emergent magnetic field, respectively, and $\partial_i$ and $\partial_t$ are the partial derivatives with respect to the spatial coordinate i and the time t, respectively. The motion of the conduction electrons is determined according to the superposition of the external electromagnetic field and also the emergent electromagnetic field determined in this way. This emergent electric field vector $e=(e_x, e_y, e_z)$ generates an electric current J vector of the form

[Formula 5]

$$\vec{J}=\rho\vec{e} \quad (5)$$

where $\rho$ is a resistivity. The corresponding voltage drop V in the conduction electrons is given by

[Formula 6]

$$V = \frac{J}{\rho}l = el. \quad (6)$$

Here, the current density vector J and the direction of the current-carrying line coincide with each other, and the component of the emergent electric field vector e in this direction is denoted as e, and the length of the line is denoted as l.

It is known that an example that has a non-collinear spin structure and results in a voltage drop is the magnetic wall dividing adjacent magnetic domains, and it has been theoretically investigated and experimentally confirmed that the magnetic wall can be driven by an electric current. The force (electric field) that can explain the voltage drop, such as imparting a potential to the charge, is known as electromotive force (emf). See, e.g., Non-Patent Documents 1 and 2 for the theory and Non-Patent Document 3 for experimental confirmation. Another non-collinear spin structure, a helical structure, has also been predicted to produce a voltage drop across the crystalline substance (Non-Patent Document 4). Non-Patent Document 4 suggests theoretically that the voltage drop in the helical structure is caused by a deformation of the spin structure of the helical structure by the magnetic field.

The inventors found that when an electric current is applied to a material with a non-collinear spin structure, an emf will be induced inside the material and the spin structure itself will also be deformed. In addition, we realized that the voltage drop could lead to an operation of inductance rather than simple resistance. In particular, we found that the dependence of the performance on the device size of inductor elements operated in this manner is advantageous for miniaturization.

1-3. Formulation of Helical Structure

Figure 2:
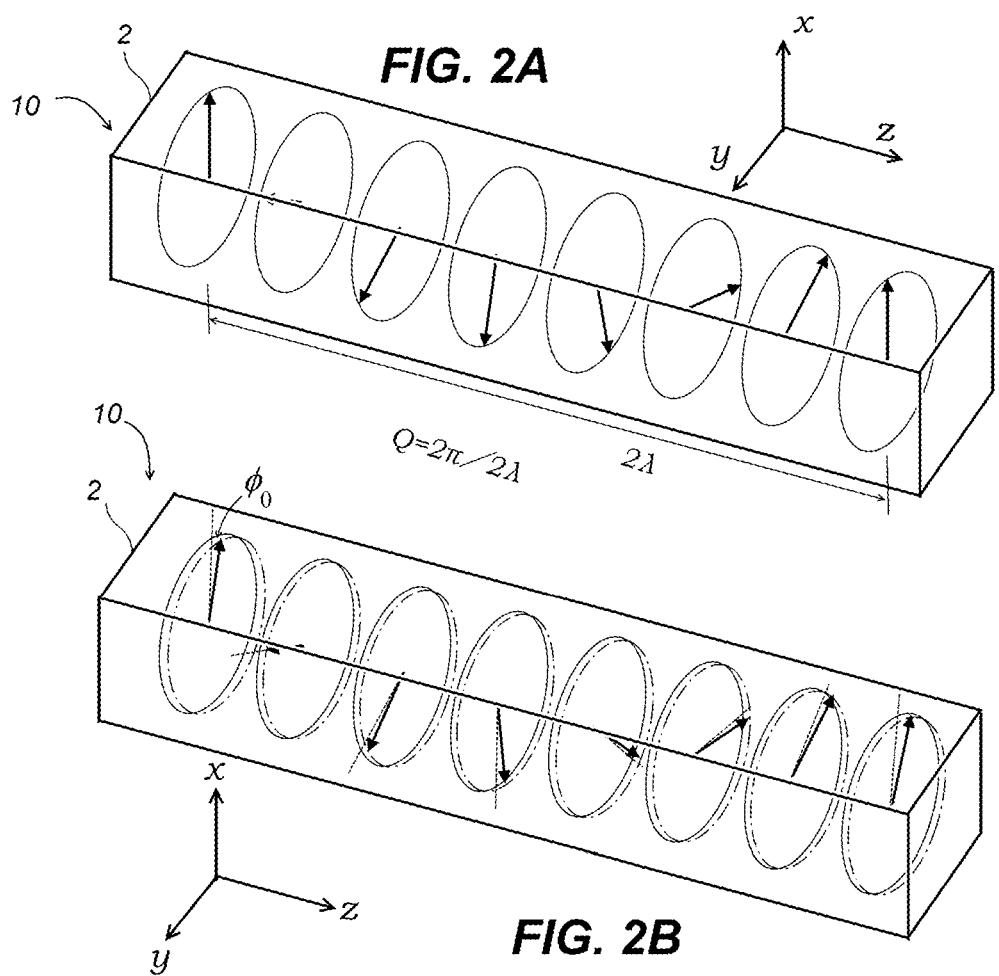
FIGS. 2A and 2B provide illustrations of the spin structure of the helix structure proposed in an embodiment of the present disclosure, showing the arrangement of the spins before the electric current is applied (FIG. 2A) and the rising of the spins perpendicular to the plane as a result of interaction with conduction electrons (FIG. 2B), respectively.

The illustrations in FIGS. 2A and 2B exemplify the spin structure of the helical structure proposed in the present embodiment. FIG. 2A shows an arrangement of the ordered spins before an electric current is applied. The positions of the ordered spins are fixed, for example, at lattice points (atoms, etc.) not shown in the figure. At a certain point of time, the ordered spin at each position is oriented in plane of a certain plane (xy-plane), and if the orientations are traced perpendicular to the said plane (z-axis orientation), they rotate in the xy-plane in proportion to the distance. When the orientations of the spins make a full revolution with a period of $2\lambda$, which period is spatial to the orientation of the helix axis, the wavenumber Q of the helix structure can be determined as $Q=2\pi/(2\lambda)$. Note that the $\lambda$ of the half-turn is the distance required for the spins to flip, which corresponds to the thickness of the magnetic wall dividing the two adjacent magnetic domains in the ferromagnetic order. Since generality will not be lost if the z-axis is defined as the axis of the wavenumber Q of the periodic structure that the helix structure has, the description in this disclosure assumes the Cartesian coordinates in such an orientation. In a conventional theoretical prediction (Non-Patent Document 2) and experimental observation (Non-Patent Document 3) regarding the generation of a potential difference at the magnetic wall by applying a magnetic field, it has been confirmed that the magnetic wall parallel to the xy plane moves in the z direction under the influence of an external magnetic field, which is oriented perpendicular to the z axis (e.g., x axis) in the helical structure shown in FIG. 2A. These disclosures involve only the control of magnetic domains by magnetic fields alone.

1-4. Deformation and Motion of Spin Structure in Helical Structure

The inventors have found that the voltage drop (Eq. (6)) is efficiently generated by the emergent electric field e (Eq. (4)) in an arrangement where a time-varying alternating current is applied in the z-axis direction, which is the direction of the helix axis. When such an electric current is applied, the conduction electrons responsible for the current interact with the spin structure. One such interaction is the rotational operation that rotates the entire spin structure around the z-axis in FIG. 2A. In addition, the rotating spin structure itself is deformed by the interaction with the conduction electrons. The deformation of the spin structure resulting from the interaction with the conduction electrons, i.e., the tilt-up of the ordered spins in the z-axis direction (plane normal direction), is shown in FIG. 2B. In contrast to the previous inductor elements, in which energy accumulation as magnetic field energy is observed as a voltage drop (Equation (1)), energy accumulation in the inductor elements of the present embodiment is caused by the tilt-up deformation of the localized spins of the helical structure. The conduction electrons, which are responsible for the current that causes the energy accumulation, detect the voltage drop caused by the emergent electric field.

1-5. Structure of Inductor Elements

Figure 3:
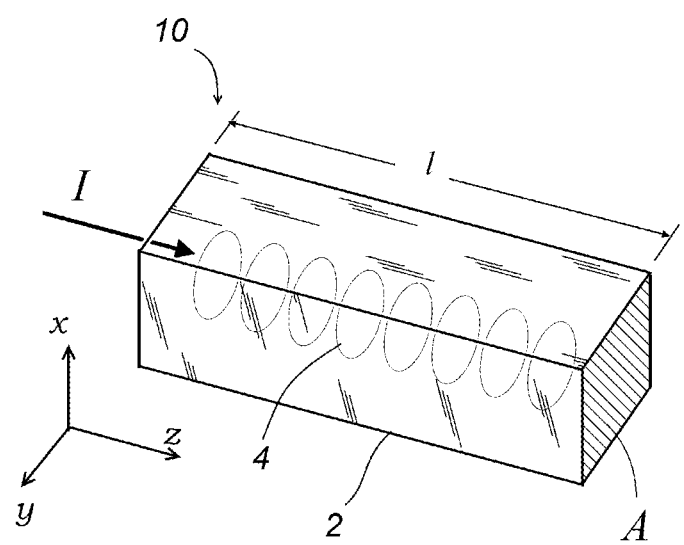
FIG. 3 shows a structure showing an example of an inductor element in an embodiment of the present disclosure.

This section describes the configuration of the inductor element of this embodiment. The structure of the inductor element of the present embodiment is shown in FIG. 3. The inductor element 10 has a metal medium 2 having a non-collinear spin structure inside. If the spin structure is a helical structure, the outer shape of the metal medium 2 extends along the z-axis (FIG. 2A) so that the current is guided along the z-axis, which is most typically the direction of the wavenumber Q of the helical structure. An electric current I flows through the metal medium 2 in the direction it extends. This allows the electric current I to generate an emergent electric field against the ordered spins of the helical structure (more generally, the non-collinear spin structure), which is detected by the conduction electrons responsible for the electric current I. The direction of the electric current I is, more generally, any direction in which the non-collinear spin structure can generate an emergent electric field from the current. For example, if the localized spins are spatially oriented so that they have a non-collinear spin structure when traced in a certain direction (the z-axis direction in FIG. 3), the outer shape of the metal medium 2 is formed so that the current flowing through it has a projection component along the z-axis direction which gives the non-collinear spin structure. FIG. 3 depicts, as an example, a structure of an inductor element 10 employing a metal medium 2 where the metal medium 2 has the non-collinear spin structure of the helix structure shown in FIG. 2, while indicating a representation of the disk 4 containing the spins but omitting the arrows indicating the direction of the spins in FIG. 2. The metal medium 2 has a cross-sectional area A and a length l, at least locally, and an electric current I flows across this cross-sectional area over the length l. In general, the inductor element 10 is connected to an electric circuit, so the electric current I is the current flowing through the circuit to the inductor element 10. In FIG. 3, the metal medium 2 is depicted as a rectangular shape, but it can take any shape or form as long as the above relationship with the non-collinear spin structure is satisfied; for example, it can be a thin film, film, wiring, or any other pattern and external shape.

The performance of an inductor element, such as the inductance value, can be evaluated by estimating the degree of deformation of the spin structure caused by the interaction between the conduction electrons and the spin structure. The relationship between the deformation of the spin structure and the electric current due to the conduction electrons flowing through it can be analyzed by the equation of motion for the spin structure. The vector n, which represents the spin structure of the helix shown in FIG. 2A, is determined only by z in xyz Cartesian coordinates and is written as

[Formula 7]

$$\vec{n} = \vec{e}_1 \cos(Qz+\Psi) + \vec{e}_2 \sin(Qz+\Psi) + m\vec{e}_3 \quad (7)$$

with vectors $e_1$, $e_2$, and $e_3$ as unit vectors in each of the xyz Cartesian coordinates. The vector n, which indicates the orientation of the localized spins, is a vector whose length is 1 at each position, whose orientation is in the xy-plane when m is 0, and whose orientation is determined by z and the magnitude Q of the wavenumber vector of the helix structure. The tip of the vector n draws a helix when the vector n is traced along the direction (z-axis) of the wavenumber vector with magnitude Q. m is the component of tilt-up in the z-axis direction, which means that it has tilt-up if m is non-zero. Here, we introduce the translational motion coordinate X of the helix structure with respect to the position of the z-axis,

[Formula 8]

$$\cos(Qz+\Psi) = \cos(Q(z-X)) \quad (8)$$

where X reflects $\Psi$, which represents the phase of the helix structure that maintains the wavenumber Q, indicating the position of, so to speak, the center of the helicity. The equation of motion governing spins is also known as the Landau-Lifshitz-Gilbert (LLG) equation. Additionally, taking into account the interaction with the electric current by the conduction electrons, the equation of motion for the spin structure is given by the following equations, where $\varphi_0$ is the angle of elevation of the spin from the xy-plane to the z-direction

[Formula 9]

$$\begin{cases} \lambda\dot{\phi}_0 + \alpha\dot{X} = \dfrac{a^3 P}{2eS}\beta j - v_{pin}\sin\dfrac{X}{\lambda} & (9.1) \\ \dot{X} - \alpha\lambda\dot{\phi}_0 = \dfrac{1}{2}v_c\sin 2\phi_0 + \dfrac{a^3 P}{2eS}j & (9.2) \end{cases} \quad (9)$$

where $\alpha$ is the Gilbert damping term, $\beta$ the non-adiabatic effect term, S the magnitude of the spins, P the spin polarizability, a the lattice constant, e the elementary charge, $v_{pin}$ a quantity with a dimension of velocity representing the pinning strength, $v_c$ a quantity proportional to the spin anisotropy energy, and j the current density of the conduction electrons. Performing the variable transformation as in

[Formula 10]

$$\dfrac{a^3 P}{2eS} = \zeta \quad (10)$$

and assuming that the variable in sin is small, Equation (9) becomes

[Formula 11]

$$\begin{cases} \lambda\dot{\phi}_0 + \alpha\dot{X} - \dfrac{v_{pin}}{\lambda}X = \zeta\beta j & (11.1) \\ \dot{X} - \alpha\lambda\dot{\phi}_0 - v_c\phi_0 = \zeta j & (11.2) \end{cases} \quad (11)$$

Equation (11) can be linearized using the time dependence term $\exp(-i\omega t)$ where i is an imaginary unit, assuming that the required physical quantity is represented by the real part of the complex number, and can be reduced into

[Formula 12]

$$\begin{pmatrix} -i\omega\lambda & -i\omega\alpha + \dfrac{v_{pin}}{\lambda} \\ i\alpha\lambda\omega - v_c & -i\omega \end{pmatrix} \begin{pmatrix} \phi_0 \\ X \end{pmatrix} = \zeta j \begin{pmatrix} \beta \\ 1 \end{pmatrix}. \quad (12)$$

Since Equation (12) is expressed in terms of a 2×2 matrix of complex variables, it can be solved analytically as

[Formula 13]

$$\begin{pmatrix} \phi_0 \\ X \end{pmatrix} = \dfrac{\zeta j}{D(\omega)} \begin{pmatrix} -i\omega & i\omega\alpha - \dfrac{v_{pin}}{\lambda} \\ v_c - i\alpha\lambda\omega & -i\omega\lambda \end{pmatrix} \begin{pmatrix} \beta \\ 1 \end{pmatrix} = \dfrac{\zeta j}{D(\omega)} \begin{pmatrix} -i\beta\omega + i\omega\alpha - \dfrac{v_{pin}}{\lambda} \\ \beta(v_c - i\alpha\lambda\omega) - i\omega\lambda \end{pmatrix} \quad (13)$$

using a determinant $D(\omega)$. Here, the determinant $D(\omega)$ becomes

[Formula 14]

$$D(\omega) = -\lambda\left[(1+\alpha^2)\omega^2 + i\alpha\omega\left(\frac{v_c}{\lambda} + \frac{v_{pin}}{\lambda}\right) - \frac{v_c}{\lambda} \cdot \frac{v_{pin}}{\lambda}\right]. \quad (14)$$

From this we obtain the elevation angle $\varphi_0$, which is the deformation of the spin structure, and it is calculated as

[Formula 15]

$$\phi_0 = \frac{\zeta j}{\lambda} \frac{i\omega(\beta-\alpha) + \frac{v_{pin}}{\lambda}}{(1+\alpha^2)\omega^2 + i\alpha\omega\left(\frac{v_c}{\lambda} + \frac{v_{pin}}{\lambda}\right) - \frac{v_c}{\lambda} \cdot \frac{v_{pin}}{\lambda}}. \quad (15)$$

Equation (15) is the general form expressing the deformation of the spin structure. Here, we introduce two physical quantities based on insights into physical aspects. These share the same physical dimension with the current density j, and have threshold aspects based on the pinning action, as follows $j_{int}$: threshold current density due to intrinsic pinning $\zeta j_{int} = v_c/2$ $j_{pin}$: threshold current density due to extrinsic pinning $\zeta \beta j_{pin} = v_{pin}$ where $j_{int}$ is the current density corresponding to a threshold value for overcoming the spin anisotropy of the spin structure itself. On the other hand, $j_{pin}$ is the current density corresponding to the threshold value for overcoming impurity-induced pinning. In addition, by being substituted by two characteristic frequencies:

$v_{int} = v_c/\lambda$ $v_{pin} = v_{pin}/\lambda$

Equation (15) can be reduced into

[Formula 16]

$$\phi_0 = \frac{\zeta j}{\lambda} \frac{i\omega(\beta-\alpha) + v_{pin}}{(1+\alpha^2)\omega^2 + i\alpha\omega(v_{pin} + v_{int}) - v_{pin}v_{int}}. \quad (16)$$

Next, we divide into cases in terms of the relationship between $v_{pin}$ and $v_{int}$, and investigate how the value of elevation angle $\varphi_0$ is expressed for each range of values of $\omega$ (the time-dependent angular frequency of elevation angle $\varphi_0$. The results can be easily understood by dividing them into two cases, Cases A and B, in terms of $v_{pin}$ and $v_{int}$, and then dividing each case in terms of the value of angular frequency $\omega$ (six cases in total). At this point, it is assumed that $v_{pin} \ll v_{int}$ as $\alpha, \beta \ll 1$. Therefore, the denominator of the right-hand side of Equation (16) is reduced to $\approx \omega 2 + 1\alpha\omega v_{int} - v_{pin}v_{int}$. The "Denominator" and "Numerator" in this and other cases are those in the right-hand side of Equation (16) unless otherwise noted.

$v_{pin} \ll \alpha v_{int} \ll v_{int}$ (A)

$\omega \ll v_{pin}/\alpha \ll v_{int}$ A-(i)

In this case, we have

Denominator $\approx -v_{pin}v_{int}$

Then, we have

[Formula 17]

$$\phi_0 \approx \frac{\zeta j}{\lambda} \frac{v_{pin}}{-v_{pin}v_{int}} = -\frac{\zeta j}{\lambda v_{int}} = -\frac{\zeta j}{v_c} = -\frac{j}{2j_{int}}. \quad (17)$$

$v_{pin}/\alpha \ll \omega \ll v_{int}$ A-(ii)

In this case, we have

Denominator $\approx i\alpha\omega v_{int}$, Numerator $\approx i\omega(\beta-\alpha)$ Then, we have

[Formula 18]

$$\phi_0 \approx \frac{\zeta j}{\lambda} \frac{i\omega(\beta-\alpha)}{i\omega\alpha v_{int}} = \frac{\beta-\alpha}{\alpha} \cdot \frac{\zeta j}{\lambda v_{int}} = \frac{\beta-\alpha}{\alpha} \frac{j}{2j_{int}}. \quad (18)$$

$v_{int} \ll \omega$ A-(iii)

In this case, we have

Denominator $\approx \omega 2$, Numerator $i\omega(\beta-\alpha)$

Then, we have

[Formula 19]

$$\phi_0 \approx \frac{\zeta j}{\lambda} \frac{i(\beta-\alpha)}{\omega}. \quad (19)$$

$\alpha v_{int} \ll v_{pin} \ll v_{int}$ (B)

$\omega \ll \alpha v_{int} \ll v_{pin} \ll v_{int}$ B-(i)

In this case

Denominator $\approx i\alpha\omega v_{int} - v_{pin}v_{int} \approx -v_{pin}v_{int}$ (therefore, $i\alpha\omega v_{int} \ll i\alpha 2 v_{int}$)

Numerator $\approx v_{pin}$

Then, we have

[Formula 20]

$$\phi_0 \approx \frac{\zeta j}{\lambda} \frac{v_{pin}}{-v_{pin}v_{int}} = -\frac{\zeta j}{\lambda} \cdot \frac{1}{v_{int}} = -\frac{j}{2j_{int}}. \quad (20)$$

$\alpha v_{int} \ll \omega \ll (v_{pin}v_{int})^{1/2}$ B-(ii)

In this case,

Denominator $\approx -v_{pin}v_{int}$

Numerator: $\alpha\omega/v_{pin} \ll \alpha(v_{int}/v_{pin})^{1/2} \ll \alpha(1/\alpha)^{1/2} = \alpha^{1/2}$ therefore, Numerator $\approx v_{pin}$ Then, we have

[Formula 21]

$$\phi_0 \approx -\frac{j}{2i_{int}}. \quad (21)$$

$$(v_{pin}v_{int})^{1/2} \ll \omega \ll v_{int} \quad \text{B-(iii)}$$

In this case, we have

Denominator: $\omega^2$

Numerator: $\alpha\omega/v_{pin} \gg (v_{int}/v_{pin})^{1/2} \gg 1$ therefore, Numerator$\approx i\omega(\beta-\alpha)$ Thus, we have

[Formula 22]

$$\phi_0 \approx \frac{\zeta j}{\lambda} \frac{i(\beta-\alpha)}{\omega}. \quad (22)$$

Figure 4A:
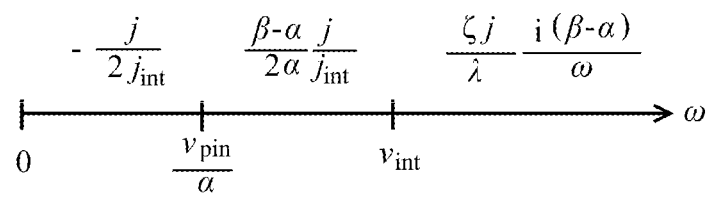
FIGS. 4A and 4B provide illustrations of the angles of elevation $\varphi_0$ collectively in each range of angular frequency $\omega$ in an embodiment of the present disclosure.
Figure 4B:
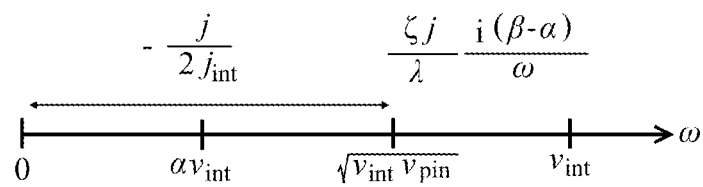

The elevation angle $\phi_0$ thus obtained is summarized in FIGS. 4A and 4B for each range of angular frequency $\omega$.

1-6. Emergent Electric Field in Helical Spin Structure

To classify the emergent electric field in terms of the helical spin structure, we can calculate Equation (4) for the spin field structure shown in Equation (6). Since

[Formula 23]

$$\partial_t \vec{n} = \partial_t \Psi(-\vec{e}_1 \sin(Qz+\Psi) + \vec{e}_2 \cos(Qz+\Psi)) + \partial_t m \vec{e}_3$$

$$\partial_z \vec{n} = Q(-\vec{e}_1 \sin(Qz+\Psi) + \vec{e}_2 \cos(Qz+\Psi)) + \partial_z m \vec{e}_3 \quad (23)$$

holds, substituting these into Eq. (4.1) yields

[Formula 24]

$$e_z = \frac{\hbar}{2e} \vec{n} \cdot (\partial_z \vec{n} \times \partial_t \vec{n}) \quad (24)$$

$$= \frac{\hbar}{2e} Q[\vec{e}_1 \cos(Qz+\Psi) + \vec{e}_2 \sin(Qz+\Psi)] \cdot$$

$$\{[-\vec{e}_1 \sin(Qz+\Psi) + \vec{e}_2 \cos(Qz+\Psi)] \times \partial_t m \vec{e}_3\}$$

$$= \frac{\hbar Q}{2e} [\vec{e}_1 \cos(Qz+\Psi) + \vec{e}_2 \sin(Qz+\Psi)] \cdot$$

$$[\vec{e}_2 \sin(Qz+\Psi) + \vec{e}_1 \cos(Qz+\Psi)] \times \partial_t m$$

$$= \frac{\hbar Q}{2e} \partial_t m.$$

Here, $m \approx \phi_0$ is satisfied for small $\phi_0$. Therefore, we have

[Formula 25]

$$e_z = \frac{\hbar Q}{2e} \partial_t m = \frac{\hbar \pi}{2e\lambda} \partial_t \phi_0. \quad (25)$$

Note that $Q = 2\pi/(2\lambda) = \pi/\lambda$. The partial derivative over time in Equation (25) can be replaced by $-i\omega$ for the component of angular frequency $\omega$.

2. Prediction of Performance of Inductor Elements

The performance of the inductor elements is evaluated by estimating the relevant physical quantities by applying the values of the physical parameters of actual materials, realistic values, constant values, etc. to the formulated relational equations.

2-1. Estimation of $e_z$

The spin anisotropy $K_\perp$ of intrinsic pinning is about 0.03 K to 2.4 K. This intrinsic pinning is the effect of pinning the spins so that they do not tilt-up toward the z-axis, and the anisotropy $K_\perp$ gives a strength of restoring force. This quantity becomes a measure to be overcome for spins to tilt-up. Based on the relationship between $v_c \infty K_\perp$, the threshold current density $j_{int}$, i.e., the minimum current threshold required to overcome the pinning, can be estimated to be $j_{int} = 5 \times 10^{11}$ to $4 \times 10^{13}$ A/m$^2$. However, since this value is the minimum current density required to tilt-up with a direct current (DC), the spin will tilt-up by an amount proportional to the current value when an alternating current (AC) is applied.

By substituting the partial derivative over time in Equation (25) with each frequency and taking its real part, $e_z$ can be expressed as

[Formula 26]

$$e_z = \frac{\hbar \pi}{2e\lambda}(+2\pi v)\frac{j}{2j_{int}} = \frac{\hbar \pi^2 v}{2e\lambda} \frac{j}{j_{int}}. \quad (26)$$

Here, we use the threshold current density, $j_{int}$, estimated in the above, as well as the following $\lambda = 20$ nm $= 2 \times 10^{-8}$ m $e = 1.6 \times 10^{-19}$ C $h$-bar $= 10^{-31}$ J·sec, the relationship between the z-component of the emergent electric field and the current density can be determined as the following:

[Formula 27]

$$e_z \approx \frac{10^{-31} \cdot 10}{2 \cdot 1.6 \times 10^{-19} \cdot 2 \times 10^{-8}} v\left(\frac{j}{j_{int}}\right)(V/m) \quad (27)$$

$$= 1.5 \times 10^{-31+27} v\left(\frac{j}{j_{int}}\right) = 1.5 \times 10^{-4} v\left(\frac{j}{j_{int}}\right)(V/m).$$

Furthermore, when the length of the sample is $l = 1$ mm and the current density $J = 10^9$ A/m$^2$, the voltage is $V = l e_z = 1.5 \times 10^{-7} \times v \times 10^{-3}$ (Volt)

$= 1.5 \times 10^{-10} \times v$(Volt).

If the lower limit of detection voltage is set to nVolt ($10^{-9}$ V), the lower limit of frequency $v$ ($=\omega/2\pi$) can be detected from a few Hz, and the emergent electric field could be experimentally confirmed.

2-2. Estimation of $v_{int}$ and $v_{Pin}$

Next, we estimate the values of $v_{int}$ and $v_{pin}$. For one of them, $v_{int}$, assuming a material with the conduction properties of a common metal, we have the localized spin of magnitude $S \sim 1$, the electron density n, and the lattice constant a as $na^3 \sim 1$, and the threshold current density $j_{int} \sim 10^{12}$ A/m$^2$, to obtain the following:

$v_c/2 = \xi j_{int} = a^3 P j_{int}/2eS$.

Let P=0.1 and a=4 nm, we get

[Formula 28]
$$v \approx \frac{(4\times 10^{-9})^3 0.1}{1.6\times 10^{-19}} \cdot 10^{12} \text{m/sec} \qquad (28)$$
$$= 4\times 10^{-27+19+12} \text{m/sec}$$
$$= 4\times 10^4 \text{m/sec}.$$

Hence, we can estimate as:

$v_{int}=v_c/\lambda=(4\times 10^4)/(2\times 10^{-8})=2\times 10^{12}$ sec$^{-1}$.

For the other one, $v_{pin}$, assuming $j_{pin}=10^{10}$ A/m, we have

[Formula 29]
$$v_{pin} \approx \frac{(4\times 10^{-9})^3 0.1}{1.6\times 10^{-19}} \cdot 10^{10} = 4\times 10^2 \text{m/sec} \qquad (29)$$
$$v_{pin} = \frac{v_{pin}}{\lambda} = 2\times 10^{10} \text{ sec}^{-1}.$$

Let $\alpha \sim 10^{-2}$, we have $v_{pin}\alpha v_{int}$.

2-3. Estimation of Inductance L

Next, we will explain the characteristics of the inductor element. We make an estimation of inductance L for a linear conductor of cross-sectional area A and length l, whose direction of extension is aligned with the wavenumber direction of the helical structure (FIG. 3). In Equation (1), V=l e$_z$, current value I=j A, and

[Formula 30]
$$e_z = \frac{\hbar\pi}{2e\lambda}\eta\frac{\partial j/\partial t}{j_{int}} \qquad (30)$$

are used. Here, let η be η=−½ or (β−α/2α). Then, we get

[Formula 31]
$$V = \frac{\pi\hbar}{2e\lambda}\frac{\eta l/A}{j_{int}}\frac{\partial I}{\partial t} = \frac{\pi\hbar\eta l}{2e\lambda A j_{int}}\frac{\partial I}{\partial t}. \qquad (31)$$

From this, we obtain a relationship as follows:

[Formula 32]
$$L = \frac{\pi\hbar\eta l}{2e\lambda A j_{int}}. \qquad (32)$$

Equation (32) allows us to estimate the order of L. For this purpose, we substitute the following approximate values having one effective digit: η~1, l=1 μm, A=1 μm×1 μm=10$^{-12}$ m$^2$, λ=20 nm=2×10$^{-8}$ m, j$_{int}$=10$^{12}$ A/m. By substituting the other physical constants and other values already mentioned into the above, we get $L\approx\frac{1}{2}\times 10^{-10}$ [Henry].

This value of L is about $\frac{1}{400}$ of the value of the existing device described above (L=130 nH to 270 nH approx.). What is completely different from the conventional one in this regard is a scaling law concerning the size of the inductor element itself. The dependence of the inductance value on the cross-sectional area A shows that L is proportional to A as shown in Equation (2) in the conventional case, while in the inductor element of the present embodiment L is inversely proportional to A as shown in Equations (31) and (32). In other words, the inductor device that operates on the principle of this embodiment has an innate property that is extremely favorable to device miniaturization in that L can be increased by reducing the cross-sectional area A.

2-4. Estimation of Q-Value

In order to predict the performance of the inductor element, we further calculate the Q value, which is the performance index of the inductor element.

Since $Q=L\omega/R=2\pi Lv/R$, and $R=\rho l/A$, substituting Equation (32) into these equations yields

[Formula 33]
$$Q = \frac{\pi^2\hbar\eta l v}{e\lambda A j_{int}}\frac{A}{\rho l}. \qquad (33)$$

By substituting $j_{int}=10^{12}$ A/m and λ=20 nm=2×10$^{-8}$ m and other values into the above, we obtain Q~0.3×10$^{-8}$ v/ρ (sec$^{-1}$/μΩ cm). For ρ~1 μΩ cm and v~10$^9$ sec$^{-1}$, we can obtain a value of about Q~3, which predicts that the inductor element in the present embodiment can actually function as an inductor element. In general, a good conductor with small ρ and a material with small λ (i.e., small helical pitch of the spin structure) is suitable for increasing Q.

2-5. Other Findings

Returning to FIGS. 4A and 4B, we explain some of the findings for the elevation angle φ$_0$. How the elevation angle φ$_0$ behaves with respect to the angular frequency ω is shown in FIGS. 4A and 4B. When the angular frequency ω in the temporal term is small and the operation is close to DC, the ratio of the intrinsic pinning of the current density j to the threshold current density j$_{int}$ determines the scale of the elevation angle φ$_0$ in both Cases A and B. This is the reason why the threshold current density j$_{int}$ is important in DC. However, the threshold current density j$_{int}$ is rather irrelevant at high frequencies. There are also cases where the elevation angle φ$_0$ is proportional to β−α (A-(ii), A-(iii), and B-(iii)). This means that the elevation angle φ$_0$ remains zero when a specific condition is fulfilled, where the condition is that the damping term α and the non-adiabatic effect term β are equal. If the elevation angle φ$_0$ is not generated, each ordered spin in the spin structure does not try to tilt-up in response to the conduction electron current. In this case, the helical spin structure only moves parallel to the z-axis direction. Note that a simple rotation of the helix structure about the z-axis cannot be distinguished from a translation of the helix structure itself along the z-axis for any value of the elevation angle, therefore they are considered identical. Also, if no elevation angle φ$_0$ is generated, inductance is not generated. However, since β≠α can be assumed in the actual spin structure, it can be fully expected that the elevation angle φ$_0$ is generated and that inductance is also generated.

3. Non-Collinear Spin Structure Revisited

The inductor element in the present embodiment can function equally well by adopting other non-collinear spin structures than a helical structure. One such spin structure is the cycloidal structure. In FIGS. 5A and 5B, the spin structure of the cycloidal structure is shown (FIG. 5B) in contrast to the helical structure (also referred to as a proper helix structure, FIG. 5A).

In a typical cycloidal structure, the wavenumber of the periodic structure is oriented toward the z-axis while the spins at each position are contained in the xz-plane. As mentioned above, as a result of the spin Berry phase acted on the conduction electrons in the helical structure (Proper Helix structure), an elevation angle $\varphi_0$ was generated in the direction of the helical axis. In contrast to that, in the cycloidal structure, when an electric current is applied in the z-axis direction, an elevation angle $\varphi_1$ (not shown) is generated from the xz plane to the y-axis direction. This is because the cycloidal structure can be described by the same equation in which the components of the unit vector $e_2$ and $e_3$ are interchanged in Equations (6), (23), and (24) for the helical structure described above, and because an emergent electric field $e_z$ proportional to the component of the unit vector $e_2$, i.e., the elevation angle $\varphi_1$, is generated as well. In this way, the properties established for the helix structure (proper helix structure) are also found in the case of the cycloidal structure shown in FIG. 5B. The same is true for the estimation of each value.

It should be noted that the voltage drop does not depend on the rotational plane of the spins. This is because the inductance is always in the same direction as the current flowing in the direction of the spin modulation vector, and the voltage appears in the same direction. Also, a structure combining a helical structure and a cycloidal structure can be used as an inductor element. For example, in FIG. 3, considering the multi-dimensional spin structure, we can combine a helical structure in the z-axis direction and a cycloidal structure in the y-axis direction. In such a configuration, the spins have a rotational structure with a large wavenumber (short wavelength) when viewed in a certain direction in the zy plane, and when traced in that direction, the spin structure exhibits a rotation in a disk tilted from the direction of the wavenumber vector. When the current is applied in the direction where rotation of the spin direction can be traced (the direction in which electrons sense the non-collinear spin structure), including such structures mentioned above as well as helical and cycloidal structures, the inductor element of this embodiment can be operated.

Even if the structure is not a helical or cycloidal structure, a fan structure, in which the spins swing left and right to form a fan, will in principle exhibit the same phenomenon as in the case of a helical structure. Furthermore, since the same inductance does not cause sign reversal in either of the crystal helicities (right-handed or left-handed systems), there is no need to fabricate the metal medium so that it has a single-domain structure with matching helicities of ordered spins.

In addition, other non-collinear spin structures can also be employed for this implementation of inductor elements. For example, inductor elements can be implemented in the same manner with materials that form a conical spin structure, where the spins tilt-up from the helix structure with a certain angle of elevation, or a tilted conical spin structure, where the spins are oriented along a conical surface whose conical axis is tilted from the wavenumber direction of the periodic structure. Helical structures, cycloidal structures, conical spin structures, tilted conical spin structures, and fan structures are all non-collinear spin structures; moreover, skyrmions, spin structures frustrated in three dimensions, etc. can also be employed to implement the present inductor element.

4. Experimental Proof

Figure 6:
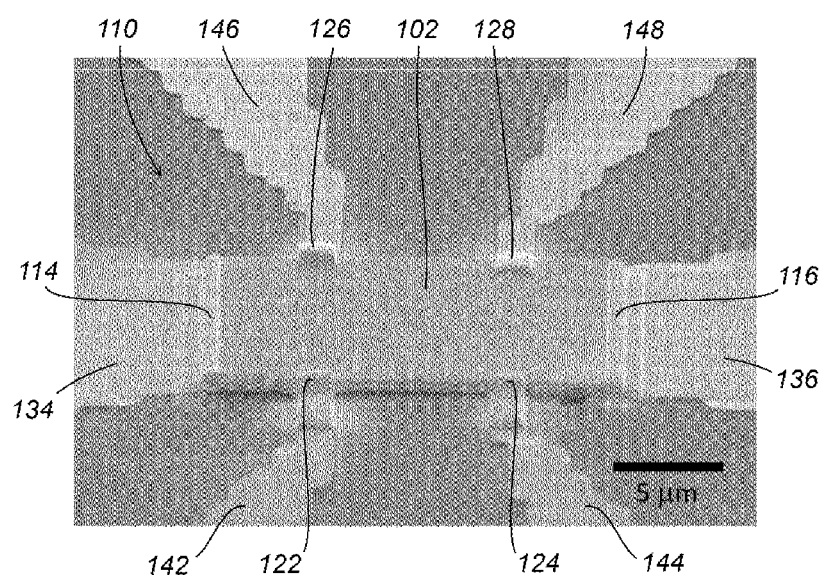
FIG. 6 is a SEM (scanning electron microscope) image of a sample of an inductor element in an embodiment of the present disclosure.

Following the filing of basic application of this disclosure application, the inventors conducted an experimental demonstration of the operation of the inductor element proposed in this embodiment as a research theme adopted by the Japan Science and Technology Agency's Core Research for Evolutionary Science and Technology (CREST) program in 2018. FIG. 6 is a scanning electron microscope (SEM) image of a sample of the inductor element 10 in the present embodiment. In the inductor element sample 110, a thin film of $Gd_3 Ru_4 Al_{12}$ with a thickness of 0.3 μm was formed into a rectangle with a width of 10 μm and a length of 20 μm, which was used as the metal medium 102. Specifically, the rectangular $Gd_3 Ru_4 Al_{12}$ was formed on a silicon substrate by the micro-sampling method using a convergent ion beam. In addition, electrodes 114-128 made of tungsten were formed on both short sides (full width) and both long sides (where a distance of 7 μm is provided between electrodes on each side) of the metal medium 102. Gold thin film wirings 134, 136, 142, 144, 146, and 148 for connection to external circuits are connected to each electrode. Specifically, the gold thin film wirings 134, 136, 142, 144, 146, and 148 were deposited by electron beam deposition and patterned by UV lithography and lift-off methods. The electrodes 114-128 were formed by convergent ion beam assisted deposition to connect the gold thin film wirings 134, 136, 142, 144, 146, and 148 to the metal medium 102. The short side ones are the drive electrodes 114 and 116 that apply an electric current to the inductor element sample 110, and the long side ones are the probe electrodes 122, 124, 126, and 128 for measuring the voltage drop along the length direction.

What is to be measured is the voltage drop between the probe electrodes 122 and 124, or between the probe electrodes 126 and 128, with the AC current applied between the drive electrodes 114 and 116. The voltage drop is measured at the same frequency component as that of the applied AC current.

Figure 7A:
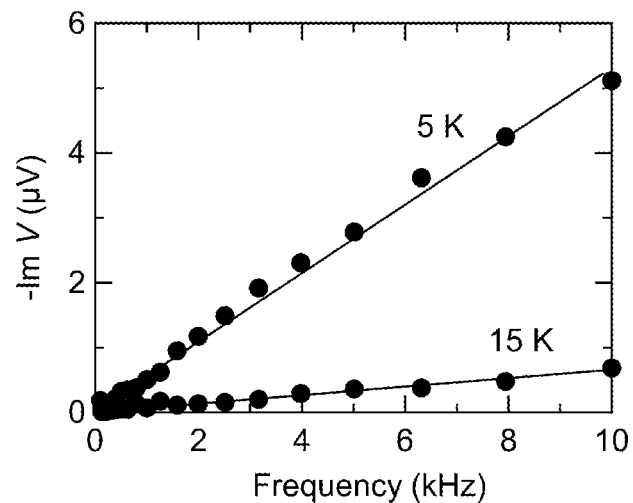
FIGS. 7A and 7B provide graphs showing the measurement results of the frequency characteristics of the voltage drop of a sample of the inductor element in an embodiment of the present disclosure, one with a linear scale (FIG. 7A) and one with a logarithmic scale (FIG. 7B).
Figure 7B:
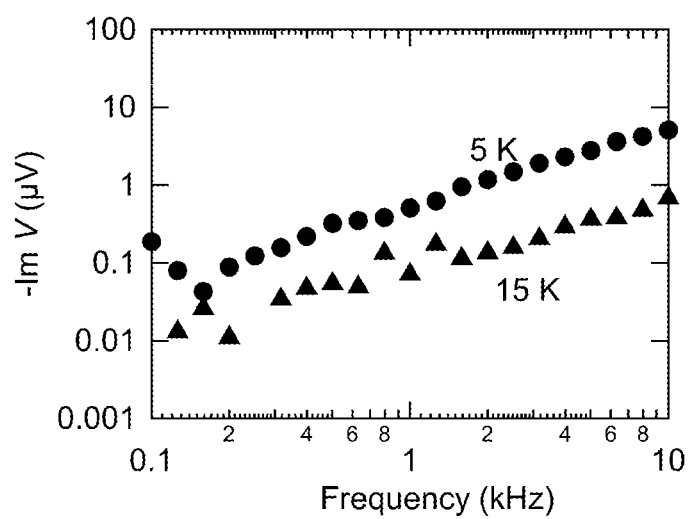

FIGS. 7A and 7B provide graphs showing the measurement results of the frequency characteristics of the voltage drop of the inductor element sample 110, one with a linear scale (FIG. 7A) and one with a logarithmic scale (FIG. 7B). In both graphs, the horizontal axes show the frequency ν (=ω/2π) of the applied sine wave AC current, and the vertical axes show the voltage drop (–Im V) appearing in the imaginary part (phase advancement component) of the AC potential difference between the probe electrodes 122 and 124. The frequency ν was measured over a range of 0 to 10 kHz, and the AC current applied between the driving electrodes 114 and 116 was set to a current density of $3.3\times10^8$ A/m². The ambient temperature was set at 5 K and 15 K to ensure stability of operation and measurement accuracy.

In general, the voltage drop V follows the relation $$Im V = \omega L I \qquad (34)$$

depending on the inductance L of the inductor element, the current I, and the angular frequency ω. Considering this, the measurement results in FIGS. 7A and 7B, where a voltage drop proportional to frequency is observed in the frequency range of 0 to 10 kHz, show that the inductor element sample 110 is actually functioning as an inductance element and that the inductance (L) is substantially constant.

If we use a measured value at a temperature of 5 K shown in FIG. 7B to calculate the value of inductance L, i.e., Im V=5 μV (value at a frequency of 10 kHz), the inductance value L can be valued at about 0.08 μH for a current density=$3.3\times10^8$ A/m², or about 80 nH.

The size and mass of the inductor element sample 110 is extremely small. The effective volume of the metal medium 102 of the above sample, taking into account the distance between electrodes, is 0.3 μm×10 μm×7 μm=21×10$^{-9}$ mm$^3$ and its mass is 1n grams, or less than 10$^{-9}$ g. Specifically, calculating the mass from the density and volume, based on the density of Gd$_3$ Ru$_4$ Al$_{12}$ (10.8 g/cm$^3$) and the volume in the sample (approx. 10×20×0.3 μm$^3$), the size of the metal medium 102 alone, not including the electrodes and substrate, is about 0.65 ng.

The volume of a conventional inductor element of 130 nH to 270 nH, which is available in the market and disclosed in Non-Patent Document 5, is about (0.6 mm×0.3 mm×0.3 mm)=54×10$^{-3}$ mm$^3$.

Thus, the inductor element provided in this embodiment can have a similar inductance value with a size and mass of about 10$^{-6}$ of that of a conventional inductor element.

5. Materials Realizing Non-Collinear Spin Structure

Next, we will explain materials that can realize the non-collinear spin structure and operate as the inductor element of the present embodiment. From the above explanation, a typical selection criterion is a metallic material that substantially has a ferromagnetic order (roughly parallel order) between adjacent spins, realizes a non-collinear spin structure as a result of modulation from the ferromagnetic order, and exhibits practical electrical conductivity. Examples of non-limiting materials that satisfy these properties are given in Table 1.

TABLE 1

| Alloy Composition/ Composition Formula | Spin Structure |
|---|---|
| MnSi | Helix Structure, Skyrmion Structure |
| Fe(Ge, Si) | Helix Structure, Skyrmion Structure |
| Co-Zn-Mn (Co$_8$Zn$_8$Mn$_4$) | Helix Structure, Skyrmion Structure |
| (Fe, Co)Si | Helix Structure, Skyrmion Structure |
| Mn(Ge,Si) | Helix Structure, Skyrmion Structure |
| YbNi$_3$Al$_6$ | Helix Structure |
| CeRhIn$_5$ | Helix Structure |
| Gd$_3$Ru$_4$Al$_{12}$ | Helix Structure, Skyrmion Structure |
| [Ir(10)/Fe(0-6)/Co(4-6)/Pt(10)]$_{20}$ | Helix Structure, Skyrmion Structure |
| [Pt(3 nm)/Co(0.9 nm)/Ta(4 nm)]$_{15}$ | Helix Structure, Skyrmion Structure |

One example of these is MnSi, which is a chiral magnetic material and can exhibit a helical structure. Note that MnSi can also exhibit a skyrmion structure under certain conditions. [Ir(10)/Fe(0-6)/Co(4-6)/Pt(10)]$_{20}$ is a composite material of platinum-based heterostructures with a unit structure of Ir/Co/Pt or Ir/Fe/Co/Pt, and within the unit structure, each metal layer has the thickness indicated in parentheses (unit: angstrom=0.1 nm). In this example, the stacked structure consists of 20 unit structures stacked repeatedly. Also, [Pt (3 nm)/Co (0.9 nm)/Ta (4 nm)]$_{15}$ is a composite material heterostructure of platinum-based heterostructure with a unit structure of Pt/Co/Ta. Each metal layer in the unit structure has the thickness (in nm) in parentheses, and is fabricated in a stacked structure with 15 unit structures repeatedly stacked. The lower limits of the domain wall widths of [Ir(10)/Fe(0-6)/Co(4-6)/Pt(10)]$_{20}$ and [Pt(3 nm)/Co(0.9 nm)/ Ta(4 nm)]$_{15}$ are about 80 nm (Non-Patent Document 6) and 90 nm (Non-Patent Document 7), respectively. Therefore, it is expected that the pitch of the helical structure can be shortened to a considerable extent.

In general, materials with a non-collinear spin structure can be employed in the present embodiment. The non-collinear spin structure is a spin structure of localized spins that are modulated from the ferromagnetic order by spin-orbit coupling, represented by the Dzyaloshinskii-Moriya interaction, and can be selected from those described above, such as helical structures. Such materials can be selected from alloys, typically containing transition metals. Materials that realize a non-collinear spin structure among localized spins as a result of the RKKY interaction, which is another generation mechanism than the spin-orbit interaction, can also be employed. In addition, a non-collinear spin structure can also be realized among localized spins by magnetic frustration, and suitable materials for the inductor device can be selected from such a group of materials.

6. Apparatus

The present disclosure also includes apparatus that incorporates electrical and electronic circuits containing the inductor elements described above. The inductor elements of the embodiments described above can be employed as basic elements for general electrical and electronic circuits, including, for example, resonant and filter circuits. The applicability of the inductor elements described above in principle is not specifically limited, but includes general electrical and electronic equipment including these electronic circuits, and includes electrical and electronic equipment, communication equipment, audio-visual equipment, and medical-related electronic equipment, whether for industrial or home use application. Since the inductor elements provided in the present disclosure can be fabricated in a lightweight and compact package, they can also be applied to hearing aids, cardiac pacemakers, and microelectromechanical systems (MEMS).

In the above description, the embodiment of the present disclosure has been described specifically. Any description in this Specification is for the purpose of explaining the present disclosure, therefore the scope of the invention of this disclosure should be determined based on recitations of the claims. Furthermore, other variation based on any combination of the embodiment is included in the present disclosure, which variation should be also within a scope of the claims.

The invention claimed is:

1. An inductor element comprising:
    a metal medium,
    wherein the metal medium has a spatial arrangement of ordered spins throughout the metal medium, the spatial arrangement of ordered spins being configured to have a non-collinear spin structure when traced in a direction,
    wherein the metal medium has an inductive property when an alternating electric current is applied through the metal medium, the alternating electric current being configured to have a projection component in the direction, and the non-collinear spin structure generating an emergent electric field through deformation of the spatial arrangement of ordered spins caused by the alternating electric current, and the emergent electric field being observed as a voltage drop in the metal medium leading to the inductive property, and
    wherein the spatial arrangement of ordered spins is other than a skyrmion or a helix structure.

2. The inductor element according to claim 1, wherein the metal medium is a material with the spatial arrangement of a helical structure whose wave vector direction is aligned with the direction.

3. The inductor element according to claim 1, wherein the metal medium is a material with the spatial arrangement of a cycloidal structure whose wave vector direction is aligned with the direction.

4. The inductor element according to claim 1, wherein the metal medium is a material with a ferromagnetic order in which adjacent ordered spins are substantially ferromagnetic.

5. An apparatus comprising an inductor element according to claim 1.

* * * * *